United States Patent [19]
Konno et al.

[11] Patent Number: 5,912,789
[45] Date of Patent: Jun. 15, 1999

[54] CRAMPING STRUCTURE OF GUIDE BAR FOR HEAD CARRIAGE IN MAGNETIC DISK DRIVE

[75] Inventors: Makoto Konno; Hisashi Shibata; Koichi Seno, all of Yamagata, Japan

[73] Assignee: Mitsumi Electric Co., Ltd., Tokyo, Japan

[21] Appl. No.: 09/020,504

[22] Filed: Feb. 9, 1998

[30] Foreign Application Priority Data

Feb. 10, 1997 [JP] Japan ..................................... 9-027053

[51] Int. Cl.⁶ ............................... G11B 5/55; G11B 21/08
[52] U.S. Cl. ............................................................. 360/106
[58] Field of Search ................................... 360/106, 105, 360/109

[56] References Cited

U.S. PATENT DOCUMENTS

| 5,126,905 | 6/1992 | Nomura et al. ......................... 360/105 |
| 5,212,417 | 5/1993 | Nagai et al. ......................... 360/106 X |
| 5,440,439 | 8/1995 | Saito ....................................... 360/106 |

*Primary Examiner*—John H. Wolff
*Attorney, Agent, or Firm*—Whitham, Curtis & Whitham

[57] ABSTRACT

A cramping structure of a guide bar for a head carriage in a magnetic disk drive is disclosed. The structure comprises a head carriage, a guide bar provided in parallel to the head carriage, a guide bar cramp provided along the guide bar in opposite side of the head carriage, wherein the head carriage includes a long plate-like base and a pair of cramp arms having a slit respectively, and extending from both ends of the base to the side of the guide bar which faces to the head carriage such that the cramp arm covers above of the guide bar; and a pair of engaging pieces provided under the pair of cramp arms respectively, wherein the pair of engaging pieces respectively includes a projection engaging the slit of the cramp arm and a notch supporting the guide bar from below thereof, wherein the pair of cramp arms urges the guide bar downwards, and the urging forces are received by the pair of notches of the engaging pieces.

4 Claims, 4 Drawing Sheets

PRIOR ART

CRAMPING STRUCTURE OF GUIDE BAR FOR HEAD CARRIAGE IN MAGNETIC DISK DRIVE

BACKGROUND OF THE INVENTION

1. Technical Field of the Invention

The present invention relates to cramping structure of guide bar for a head carriage in a magnetic disk dive. Specifically, it relates to the cramping structure of guide bar in which the guide bar is cramped by cramp arms provided on a long plate-shaped guide bar cramp.

2. Related Art

FIG. 5 shows a conventional cramping structure of guide bar. In this structure, stress receiving members 2 and 3 arm projectingly provided on a frame 1 of a magnetic disk drive. Whe the frame 1 is firmed by press molding, the stress receiving members 2, 3 are firmed by punching predetermined positions of a steel plate which is a material of the frame 1.

Also, through holes 5 and 5 are opened up on a slide table 4 of a head carriage. At the time of assembling, a guide bar 6 is inserted into the through holes 5, 5 in advance, and both edges of the guide bar 6 am abutted against the stress receiving members 2, 3 from outside (in FIG. 6, right side), then a guide bar cramp 7 is mounted along the guide bar 6 from outside.

A base 8 of the guide bar cramp 7 is formed in long plate-like, and cramp arm 9 and 9 are projectingly provided on inside (in FIG. 6, left side) of both edges of the guide bar cramp 7 respectively. The cramp arms 9, 9 are bent at a folding line 10 to erect upwards with regard to the base 8. Here, while no stress is applied to the cramp arms 9, 9 at the time of before cramping, the inclined range of the cramp arms 9, 9 are gentle more than that shown in the FIG. 5. The cramp arms 9, 9 are abutted against both edges of the guide bar 6 from outside above when the guide bar cramp 7 is mounted at the predetermined position.

After that, fixing the guide bar cramp 7 by a screw 11, the cramp arms 9, 9 are pressed upon the guide bar 6 and thus the inclined angle is widen as shown in the FIG. 5. In this manner, the guide bar 6 is supported by the stress receiving members 2, 3 from one side, and is urged by the cramp arms 9, 9 from the other side, thus is thereby cramped.

Besides, side edge faces of the cramp arms 9, 9 are bent downwards to form stoppers 12 and 12. The stoppers 12, 12 engage to prevent the guide bar 6 from moving in thrust direction by abutting against both edge faces of the guide bar 6. Further, a recess portion 13 is provided on the frame 1 to keep a space for the slide table 4 of the head carriage.

In this structure, a torque according to the screw-tightening works upon the guide bar cramp 7, and there is fear of that the guide bar camp 7 would be twisted (to the right direction in the plan view), wherein the screw 11 is the center of the twist. It makes the guide bar 6 inclined and thereby a shifting direction of the head carriage would be out of the predetermined direction.

SUMMARY OF THE INVENTION

The object of the present invention is to prevent the guide bar from twisting.

To achieve the object, there is provided a cramping structure of a guide bar for a head carriage in a magnetic disk drive comprises a head carriage, a guide bar provided in parallel to the head carriage, a guide bar cramp provided along the guide bar in opposite side of the head carriage, wherein the head carriage includes a long plate-like base and a pair of cramp arms having a slit respectively, and extending from both ends of the base to the side of the guide bar which faces to the head carriage such that the cramp arm covers above of the guide bar; and a pair of engaging pieces provided under the pair of cramp arms respectively, where the pair of engaging pieces respectively includes a projection engaging the slit of the cramp arm and a notch supporting the guide bar from below thereof, wherein the pair of cramp arms urge the guide bar downwards, and the urging forces are received by the pair of notches of the engaging pieces.

BRIEF DESCRIPTION OF THE DRAWINGS

In the accompanying drawings:

FIG. 5(*b*) is a section view taking along the C—C shown in FIG. 5(*a*); and

FIG. 5(*c*) is a section view taking along the line D—D shown in FIG. 5(*a*).

DETAILED DESCRIPTION OF THE EMBODIMENT

Figure 1:
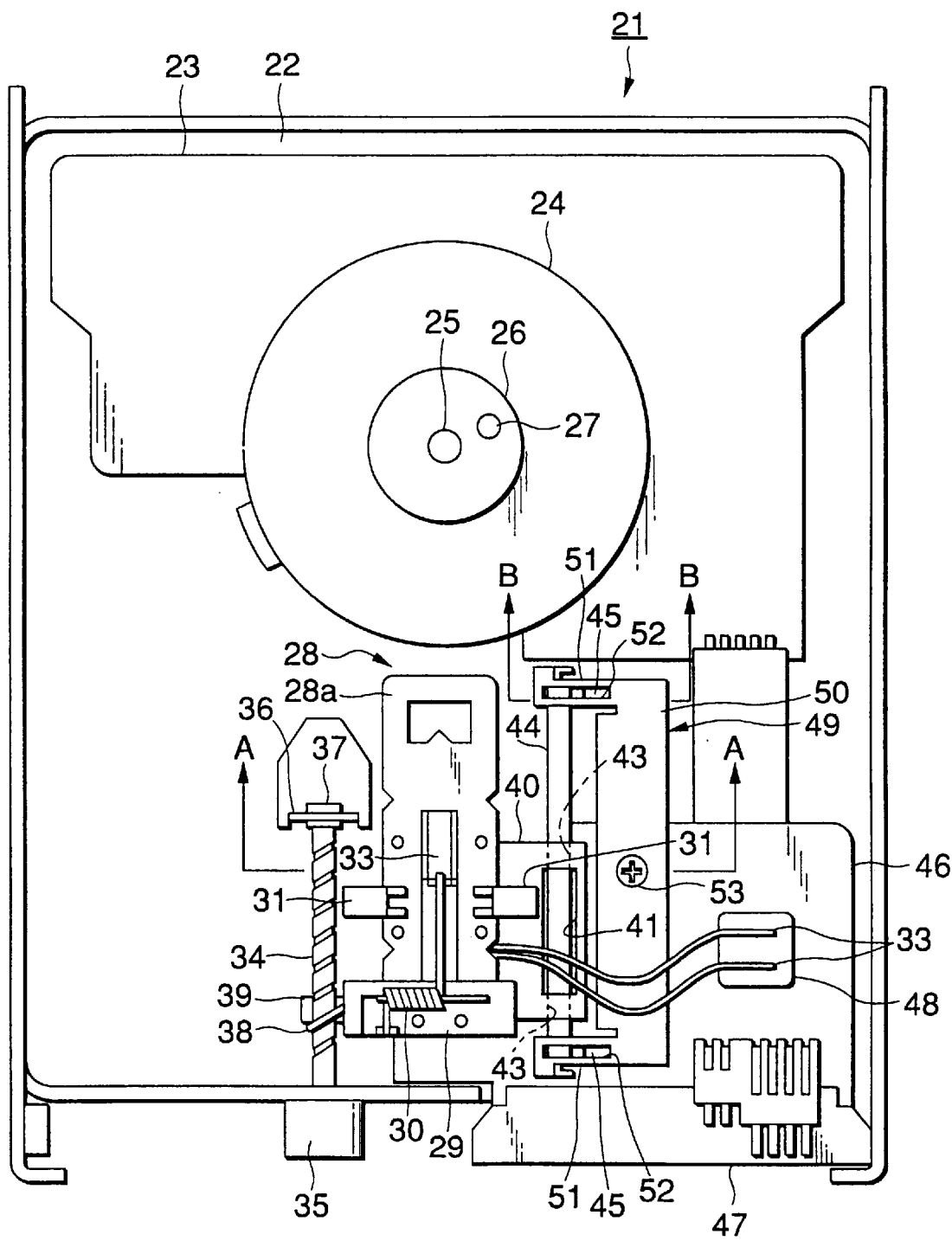
FIG. 1 is a plan view of inner structure of a 3.5-inch floppy disk drive, showing one embodiment of the present invention.

Now, descriptions will be given below in detail of one embodiment of the present invention with reference to FIGS. 1 to 4. FIG. 1 shows inner structure of a 3.5-inch floppy disk drive 21, a printed board 28 lies on a lower frame 22 made of stainless steel, and a rotor 24 is rotatably fitted on the printed board 23 and a spindle shaft 25, wherein the spindle shaft 25 is a central axis thereof. The central portion of the rotor 24 is raised (in FIG. 1, toward this side) and thereby a disk table 26 is formed. Since the surface of the disk table 26 is formed being a magnet if a 3.5-inch floppy disk (not shown) is horizontally inserted into the 3.5-inch floppy dis& drive 21 from front face (in FIG. 1, upper end) thereof, a hub of the 3.5-inch floppy disk is attracted by the disk table 26 and brought into contact with it.

Besides, a coil is provided on the surface of the printed board 23. An induction magnetic field is generated from the coil and acts on a rotor magnet disposed along inner peripheral free of a rim of the rotor 24, thereby the rotor 24 rotates. When a chucking roller 27 disposed floatably on the surface of the disk table 26 rotates and arrives at a window formed on the hub, the chucking roller engages with the hub and thereby chucking of the 3.5-inch floppy disk is achieved. After that, the 3.5-inch floppy disk rotates with the rotor 24.

Figure 2:
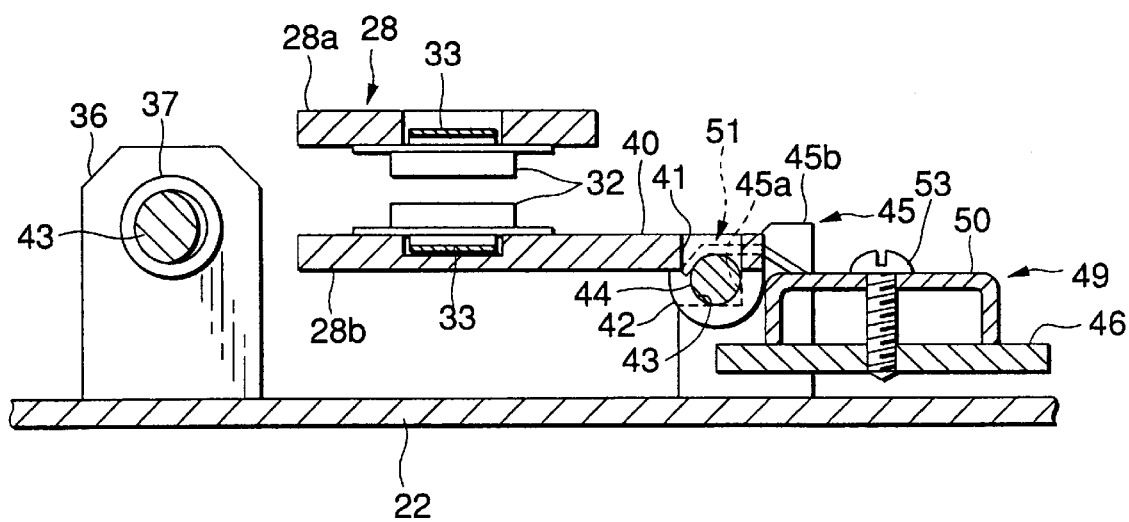
FIG. 2 is a section view taking along the line A—A shown in FIG. 1.
Figure 3:
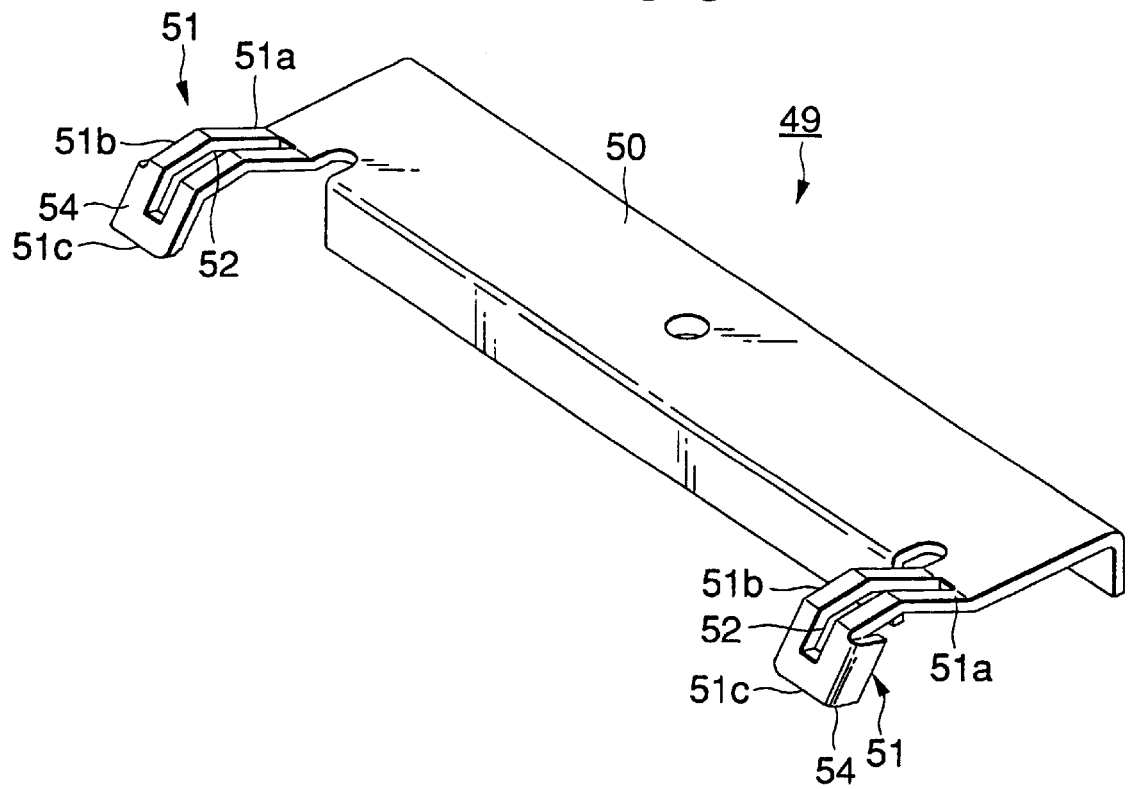
FIG. 3 is a perspective view of the guide bar cramp shown in FIG. 1.

A head carriage 28 is disposed along front-to-rear direct of the disk drive 21 under the rotor 24 such that the head carriage 28 is positioned along with the radial direction of the rotor 24. As shown in FIG. 2, the head carriage 28 consists an upper piece 28*a* and a lower piece 28*b* which are plate-shaped respectively. The lower piece 28*b* is horizontally disposed as described later, and a base 29 is disposed on rear end (in FIG. 1, lower end) of the lower piece 28*b*. The upper piece 28*a* is disposed such that it is movable in a certain degree in vertical direction, and the upper piece 28a is urged by a spring 30 such that front end thereof is pressed down and also projections 31 and 31 provided on top face of the upper piece 28a engages with top face of a upper frame (not shown), thereby the upper piece 28a is enabled to keep horizontal state thereof.

Further, magnetic heads 32 and 32 are disposed an bottom face of the front end of upper piece 28a and top face of the front end of lower piece 28b respectively such that the magnetic heads 32, 32 are facing each other. Flexible printed codes 33 and 33 whose shapes are thin and narrow belt-like are connected with the magnetic heads 32, 32 respectively. The flexible printed code 33, 33 are respectively extending from the magnetic heads 32, 32 and pass through between the upper piece 28a and the lower piece 28b, then turn to the right at the front of the base 29 and extending toward outside of the head carriage 28.

Besides, a feed screw 34 for front-to-rear shifting of the head carriage 28 is horizontally spanned in the front-to-rear direction of the disk drive 21 at the left side of the head carriage 28. Rear end of the feed screw 34 pierces rear side wall of the lower frame 22 and consists a spindle shaft of a stepping motor 35 fixed on outer face of the rear side wall. On the other hand, front end of the feed screw 34 is rotatably supported by a supporting piece 36 via a bearing 37, wherein the supporting piece 36 is provided by cutting and raising the predetermined portion of the lower frame 22.

Further, a pin 38 and a spring plate 39 are protruded from left side face of the base 29 of the head carriage 28. The pin 38 inclines to rearward (in FIG. 1, downward) and engages with a groove on the feed screw 34 from above. The spring plate 39 extends toward under the feed screw 34 and urges the feed screw 34 upwards (in FIG. 1, toward this side).

Still further, there is horizontally provided a slide table 40 extending from right side portion of the lower piece 28b. The slide table 40 indulges a opening 41, which is opened up on top face thereof and is extending in front-to-rear direction thereof, and hung portions 42 and 42 provided at the front and rear ends respectively. Through holes 43 and 43 are opened up on each of the hung portion 43, 43 respectively, and a guide bar 44 extending in the front-to-rear direction is inserted into the through holes 43, 43.

Furthermore, engaging pieces 45 and 45 as stress receiving members are provided by cutting and erecting the predetermined portions of the lower frame 22, the positions will be discussed later in more detail. Here, left side of top end of the engaging pieces 45, 45 are cut rectangularly to form engaging notches 45a and 45a for engaging the guide bar 44, and thereby projections 45b and 45b are formed at right side of the top end of engaging pieces 45, 45.

Although detailed representation is omitted, a printed board 46 is disposed at right rear portion of the lower fame 22 and a spacer is inserted between the printed board 46 and the lower frame 22. The engaging piece 45, positioned in the vicinity of the rear end of lower frame 22 is piercing through the spacer and the printed board 48, and is projecting toward above. A connector socket 47 for connecting with a main computer is disposed on rear end edge of the printed board 46, a modular 48 for connecting with end of the flexible printed codes 33, 33 is mounted on the right side of top face of the printed board 46, and a guide bar cramp 49 is disposed an the left side of top face of the printed board 46.

As shown in FIG. 8, a base 50 of the guide bar cramp 49 is formed so as to be not only long plate-like but also U-shaped in a section view, and cramp arms 51 and 51 are projectingly provided on both of front and rear end portion of the guide bar cramp 49. The cramp arms 51, 51 are bent trapsoidaly in a side view. Namely, each of the cramp arms 51 comprises a base portion 51a angled upwards wit regard to the base 50, an intermediate portion 51b extending substantially horizontal, and an end portion 51c angled downwards, and further a slit 52 is opened up such that the slit 52 extends from one end of the base portion 51a to half of the end portion 51c.

Figure 4:
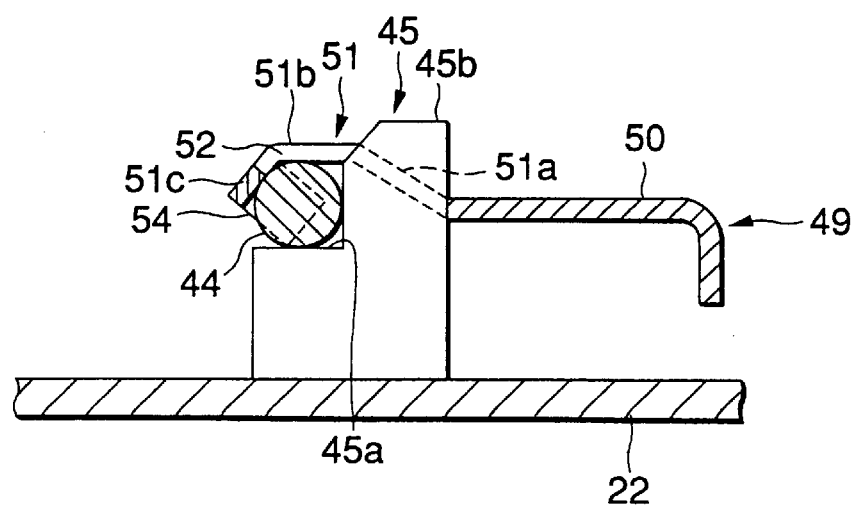
FIG. 4 is a section view taking along the line B—B shown in FIG. 1.

In assembling the 3.5-inch floppy disk drive 21, the guide bar cramp 49 is mounted on the printed board 46 while the projections 45b, 45b of the engaging pieces 45, 45 are inserted into the slits 52, 52 of the cramp arms 51, 51. At the time, the guide bar cramp 49 is not screw-tightened. Here, the positions of the engaging pieces 45, 45 described before are determined such that the insertion can be achieved. In this state, the intermediate portions 51b, 51b and the end portions 51c, 51c are sank down into the notches 48a, 45a more than what is shown in FIGS. 1, 2 and 4.

On the other hand, the head carriage 28 and the guide bar 44 are combined previously before cramping by inserting the guide bar 44 into the through holes 43, 43 of the head carriage 28. Next, the pin 38 and the spring plate 39 is engaged with the feed screw 34, and the guide bar 44 is slipped into under the end portions 51c, 51c of the cramp arms 51, 51 while the end portions 51c, 51c are raised slightly. Then the both ends of the guide bar 44 are engaged with the notches 45a, 45a and thereby the guide bar 44 are spanned onto the engaging pieces 45, 45.

After then, fixing the guide bar cramp 49 by a screw 53, the intermediate portions 51b, 51b and the end potions 51c, 51c are pressed onto the guide bar 44 and raised thereby. The cramp arms 51, 51 urge the guide bar 44 as a reaction of that, and this urging force is received by the engaging pieces 45, 45, thus the guide bar 44 is cramped. Also, movement of the guide bar 44 in the thrust direction is restricted by stoppers 54 and 54 hanging from side edge of the end portions 51c, 51c of the cramp arms 51, 51.

Further, since the cramp arms 51, 51 of the guide bar cramp 49 are engaged with the engaging pieces 45, 45, the guide bar cramp 49 would not be twisted by the screw-tightening torque when the guide bar cramp 49 is fixed by the screw 53. Therefore, the guide bar 44 is precisely cramped, not only in the horizonal but also in the predetermined direction.

In this manner, the head carriage 28 is mounted between the feed screw 84 and the guide bar 44 which are spanned in parallel along the front-to-rear direction such that the head carriage 28 is separated from the lower frame 22. After then, the flexible printed codes 33, 33 are connected with the modular 48.

If the head carriage 28 and the guide bar 44 are mounted at first, it is necessary to put the guide bar cramp 49 through under the flexible printed codes 33, 33. This procedure have to be done carefully not to damage the flexible printed codes 33, 33. That is why that the guide bar cramp 49 is mounted at first, then the head carriage 28 and the guide bar 44 are disposed and the flexible printed codes 33, 33 bar connected lastly.

Figure 5A:
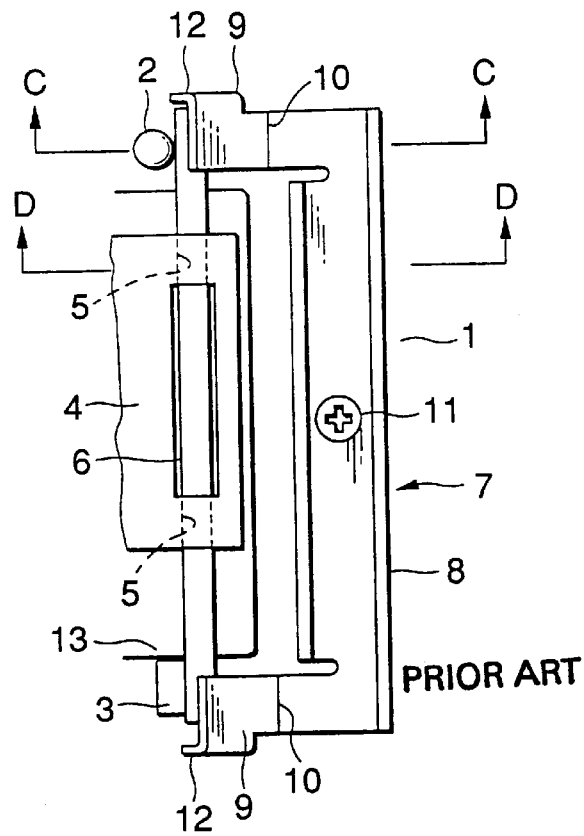
FIG. 5(*a*) is a plan view of conventional cramping structure of guide bar.
Figure 5B:
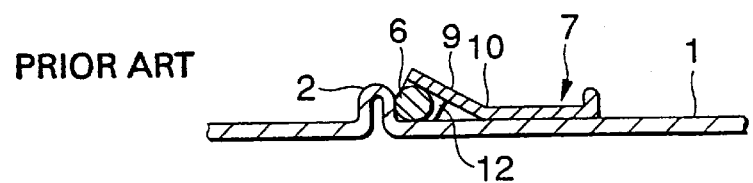
Figure 5C:
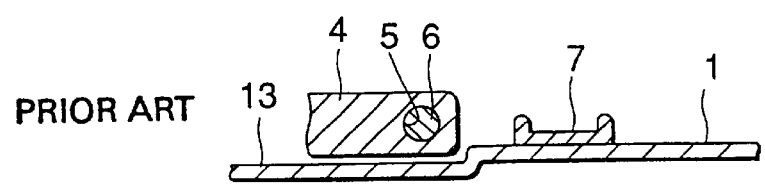

In the conventional structure as shown in FIG. 5, however, even if the guide bar cramp 7 is mounted at first, the guide bar 6 has to be disposed before the screw-tightening. At that time, since the guide bar camp 7 would be moved, thus the operation efficiency would be worse. In contrast, according to the present invention, since the cramp arms 51, 51 are engaged with the engaging pieces 45, 45, the guide bar cramp 49 is stabilized without the screw-tightening. Therefore, it is possible to adopt the aforementioned assembling process.

In this structure, driving the stepping motor 35 and thereby letting the feed screw 34 rotate, the head carriage 28 goes forward or back with the guide of the feed screw 34 and the guide bar 44. Since the guide bar 44 is spanned precisely in the horizontal along the front-to-rear direction, precise horizontal movement of the head carriage 28 can be achieved without deviation from the front-to-rear direction. And then, the magnetic heads 32, 32 are respectively applied both sides of the 3.5-inch floppy disk chucked by the disk table 26, and thus magnetic information are read or recorded.

Also, according to the present invention, various changes and modifications are possible without departing from the scope and spirit of the invention, and of course, the present invention can cover such changes and modifications.

As has bean described heretofore, according to the present invention, since the guide bar cramp is fired by the screw in a state of that the cramp are of the guide bar cramp is fixed with the stress receiving members, the guide bar cramp cannot be twisted by the screw-tightening torque. Therefore, the guide bar could not be disposed in a state of that the guide bar is inclined, and thereby the movement of head carriage would not date form the predetermined direction.

Also, even if the head carriage and the guide bar are disposed after mounting of the guide bar cramp, the operation of disposing the head carriage and the guide bar would not be obstructed because the guide bar cramp is fitted with the stress receiving members. Therefore, in the magnetic disk drive in which the lead wire, the flexible printed codes for instance, are extended from the side of head carriage, over the guide bar cramp, and to the outside of the frame, it is not necessary to put the guide bar cramp through under the lead wires, and thus the assembling operation would be eased exceedingly.

What is claimed is:

1. A cramping structure of a guide bar for a head carriage in a magnetic disk drive comprising:

a head carriage;

a guide bar provided in parallel to the head carriage;

a guide bar cramp provided along the guide bar in opposite side of the head carriage, the guide bar cramp including a long plate-like base and a pair of cramp arms having a slit respectively, the guide bar cramp extending from both ends of the base to the side of the guide bar which faces to the head carriage such that each cramp arm covers above of the guide bar; and a pair of engaging pieces provided under the pair of cramp arms respectively, the pair of engaging pieces each including a projection engaging the slit of the cramp arm and a notch supporting the guide bar from below, thereof respectively, wherein the pair of cramp arms urges the guide bar downwards, and the urging forces are received by the pair of notches of the engaging pieces.

2. The cramping structure of the guide bar for the head carriage in the magnet disk drive as set forth in claim 1, wherein said guide bar cramp includes a pair of stoppers respectively provided on outer side of end of said pair of cramp arms for supporting both ends of said guide bar.

3. The cramping structure of the guide bar for the head carriage in the magnet disk drive as set forth in claim 1, wherein said guide bar cramp includes a screw-fixing mechanism for fixing the guide bar cramp thereof onto a frame of said magnetic disk drive, and for urging downwards and cramping said guide bar.

4. A cramping method of a guide bar for a head carriage in a magnetic disk drive which includes a head carriage, a guide bar provided in parallel to the head carriage, a guide bar cramp provided along the guide bar in opposite side of the head carriage, the guide bar cramp including a long plate-like base and a pair of cramp arms having a slit respectively, the guide bar cramp extending from both ends of the base to the side of the guide bar which faces to the head carriage such that each cramp arm covers above of the guide bar, the guide bar cramp urging the guide bar downwards, a pair of engaging pieces provided under the pair of cramp above respectively, the pair of engaging pieces each including a projection engaging the slit of the cramp arm and a notch supporting the guide bar from below thereof and receiving the urging forces of cramp arms respectively, and a screw-fixing mechanism for fixing the guide bar cramp thereof onto a frame of the magnetic disk dive, and for urging downwards and cramping the guide bar, comprising steps of:

providing the pair of engaging pieces on the frame of magnetic disk drive;

engaging the pair of slits of cramp arms with the pair of projections of engaging pieces:

slipping the guide bar into under the pair of cramp arms; and firing the guide bar cramp onto the frame of magnetic disk drive by the screw-fixing mechanism.

* * * * *